No. 866,189. PATENTED SEPT. 17, 1907.
I. CARLSON & C. BERGSTROM.
VALVE MECHANISM FOR HYDRAULIC ELEVATORS.
APPLICATION FILED AUG. 27, 1906.
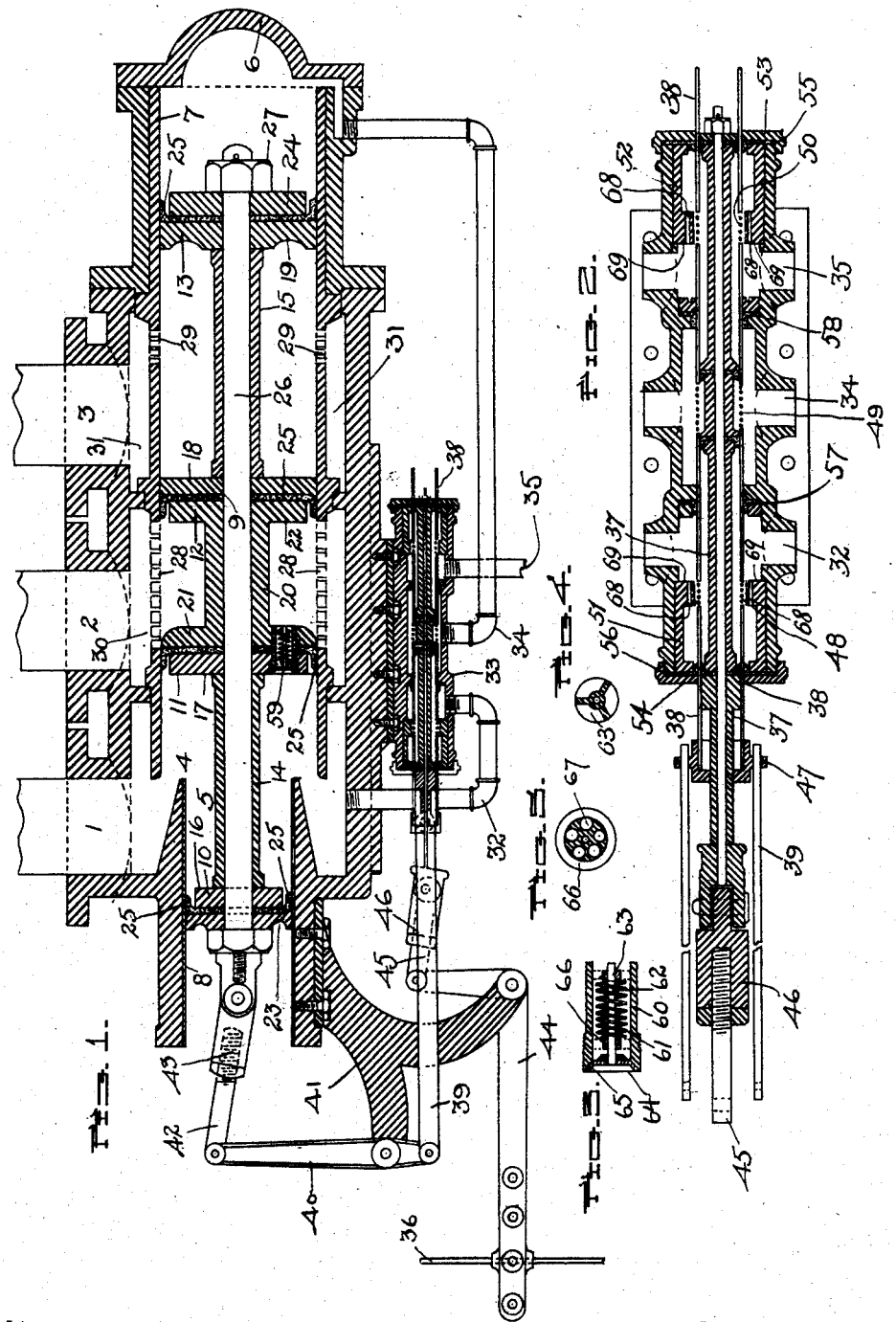

UNITED STATES PATENT OFFICE.

IVAR CARLSON AND CARL BERGSTROM, OF WORCESTER, MASSACHUSETTS.

VALVE MECHANISM FOR HYDRAULIC ELEVATORS.

No. 866,189.           Specification of Letters Patent.           Patented Sept. 17, 1907.

Application filed August 27, 1906. Serial No. 332,194.

*To all whom it may concern:*

Be it known that we, IVAR CARLSON and CARL BERGSTROM, both subjects of the King of Sweden, residing at Worcester, in the county of Worcester and State of Massachusetts, have invented a new and useful Valve Mechanism for Hydraulic Elevators, of which the following is a specification.

Our invention relates to valves specially designed to be used for controlling the water supply and exhaust of a hydraulic elevator; and the invention consists in the peculiar construction, arrangement, and combination of parts, as more fully hereinafter described.

In the drawing Figure 1 is a vertical, central longitudinal section through the valves embodying our invention. Fig. 2 is a vertical longitudinal section through a valve shown in Fig. 1. Figs. 3, 4 and 5 relate to the safety valve. Fig. 3 is a longitudinal section thereof; Figs. 4 and 5, respectively, a top view of a nut and a disk which are parts thereof.

Referring to Fig. 1, 1 is the water inlet; 2 is the pipe leading to the elevator cylinder; 3 is the exhaust pipe; 4 is the cylinder; 5 is a cylinder of smaller diameter than cylinder 4, and integrally connected therewith and partly contained therein. The cylinder 4 is provided at its outer end with a cover 6. Both cylinders are preferably provided with linings 7 and 8. 9 is the main valve provided with four piston heads 10, 11, 12 and 13, of which 11, 12 and 13 operate in the larger part of the cylinder, and the piston head 10 in the smaller extension cylinder 5. 14 and 15 are tubular stems, and joined thereto are the heads 16, 17, 18 and 19, respectively. 20 are central tubular stems having integrally formed therewith the heads 21 and 22 which together with the disks, or heads, 17 and 18 form the piston heads 11 and 12, respectively. The head or disk 16 together with the disk 23 form the piston head 10, and the disk 24 together with the disk or head 19 form together the piston head 13.

Between each pair of heads is clamped a cup-shaped packing 25, and the whole is secured together by the central bolt 26 and the nut 27.

The lining 7 is provided with circular ports 28 and 29, opening into the chambers 30 and 31, respectively. 32 is a pipe leading from the cylinder 4 to the pilot and cut-off valve 33. 34 is a pipe leading from the valve 33 to the cylinder 4. 35 is an exhaust pipe from the valve 33. The pilot valve is connected with the controlling cable 36, and the cut-off is connected with the main valve, so as to be automatically operated thereby.

In the construction shown in Fig. 2, 37 is the pilot valve, and 38 is the cut-off cylinder. The same construction is shown in Fig. 1 on a smaller scale.

The cut-off is connected to the main valve by means of the long links 39, connecting the cut-off cylinder and the short arm of the lever 40, which latter is fulcrumed in the short end of the cork 41 attached to the outside of the extension cylinder 5. The long arm of the lever 40 is connected with the main valve by means of a two-membered link 42. The parts of the link 42 have a threaded engagement 43, by means of which it may be shortened and lengthened.

The pilot valve 37 is connected with the short arm of the elbow lever 44, by means of a two-membered link 45, the latter having a threaded engagement 46, by which means its length may be adjusted. The elbow lever 44 is fulcrumed at the elbow in the long end of the fork 41, and the controlling cable 36 is attached to the outer end of the long arm of the said lever. The links 39 connect at 47 with the cut-off cylinder 38, which latter is provided with circular ports 48, 49 and 50, through which communication may be established between pipes 32 and 34, and also between pipes 34 and 35, respectively. 68 are circular, longitudinal ports through the rings 69. The pilot valve 37 is formed practically on the same principle as the main valve with the exception that in the main valve the heads 16, 17, 18 and 19, respectively, are not integrally formed with the stems, whereas in the pilot valve the corresponding heads are so formed.

The pilot and cut-off valve 33 is preferably provided with linings 51 and 52, and is also provided with the covers 53 and 54 at each end, respectively. Between the covers 53 and 54 and the ends of the valve there are elbow shaped packings 55 and 56, respectively, and at the inner ends of the chambers opening into the pipes 32 and 35, respectively, there are elbow shaped packings 57 and 58.

59 is a safety valve, which is shown on a larger scale in Fig. 3. 60 a tubular valve seat secured in the piston head 11, within which is the spring 61 encircling and holding in position the central bolt 62. The bolt 62 is provided at its inner end with nut 63, and at the other end with a cup-shaped head 64. The head 64 is provided with a packing 65. The shape of the nut 63 is shown in Fig. 4, which is a top view thereof. The spring 61 operates against the nut 63 and the disk 66, the disk 66 being secured in the valve seat 60, and provided with ports 67 as shown in Fig. 5.

In operating this device the parts being in the position shown in Figs. 1 and 2, the operator by means of the connections described, moves the pilot valve 37. If he desires the elevator to ascend, the piston 37 is moved to the left so as to establish communication between the pipe 34 and the exhaust pipe 35 through the ports 49 and 50, allowing the water back of the piston head 13 to flow back through the pipe 34 and out through the exhaust pipe 35. The water flowing through the inlet 1 into the cylinder, and pressing against the piston heads 10 and 11, respectively, the piston head 11 having a greater area than the piston head 10, the difference in pressure on the inner sides of the two heads will move the piston toward the cover 6. At the same time the movement of the piston is communicated through the short link 42, the lever 40, and the long links 39 to the cut-off cylinder 38, which is thereby brought into position, where all of the ports 50 are uncovered and the pipe 34 and the ports 49 thereupon again covered by the middle section of the pilot valve 37, thereby cutting off the communication between the pipes 34 and 35, whereupon further movement of the main valve will be arrested. Thus the amount of movement of the pilot valves always determines the movement of the main valve. This movement of the main piston establishes communication between the inlet pipe 1 and the pipe 2, through the ports 28, thereby admitting water to the operating cylinder of the elevator.

In the cut-off cylinder the ports 48 and 50, respectively, are so arranged that movement in either direction of the pilot valve will admit a sufficient amount of operating fluid through the ports affected thereby to cause a movement of the main valve by which movement the cut-off cylinder is automatically moved so as to uncover all of the ports so affected and thereby increase the flow to or from the main cylinder as the case may be.

To make the elevator descend the pilot piston 37 is moved to the right or in the reverse direction, which establishes communication between the pipes 32 and 34 through the ports 48 and 49, thus admitting water into the cylinder 4 back of the piston head 13, which will balance the pressure on the outer sides of the piston heads 13 and 11, respectively, allowing the pressure on the inner side of the piston head 10 to move the piston. This establishes communication between the pipe 2 and the exhaust pipe 3, through the ports 28 and 29 allowing the water in the elevator cylinder to exhaust. The inner end of the cylinder 5 limits the movement of the piston in this direction.

Through the ports 68 the operating medium is admitted so as to operate on both sides of the rings 69, and there is a space between the rings 69 and the sleeve 38 allowing the operating medium to pass through the ports 48 or the ports 50 when the pilot valve 37 is moved so as to establish communication between either of the said ports and the ports 49.

Sudden and excessive pressure in the operating cylinder and the pressure due to overloading the elevator is relieved by the safety valve 59, which operates automatically by means of the bolt 62, and spring 61. The water passing through the ports in the nut 63 and the disk 66, respectively, forcing back the bolt 62, and thus establishing communicaton between the pipes 1 and 2. This valve indicates when the elevator is overloaded.

The important features of our construction are its simplicity and compactness, reducing the cost of construction, the arrangement of the parts of the main valve obviating the danger of the parts thereof working loose, the safety valve indicating when the elevator is overloaded, and the pilot and cut-off valve being so constructed as to regulate the flow of water with a greater accuracy than has heretofore been obtainable.

What we claim as our invention is:—

1. In a valve mechanism for hydraulic elevators, the combination of a cylinder having integrally connected therewith and partly contained therein an extension cylinder of a smaller diameter, a piston valve operating in the said cylinder and two pistons connected thereto and operating respectively in each of the said cylinders, a safety valve connected to the said piston valve, an inlet, a pipe to the motor, and an exhaust pipe connected to the said cylinder, ports therein communicating with the said pipes and controlled by the said piston valve, a pilot and cut-off valve attached to the main valve, pipes connecting the said valve with the main valve and an exhaust pipe leading therefrom, a cut-off cylinder therein and extending therethrough connected with the main valve and automatically operated thereby, ports therein leading respectively to the pipes connected therewith, a pilot valve contained in the said cut-off cylinder controlling the said ports and having means for external and independent control, all substantially as described.

2. In a hydraulic elevator the combination with a main valve of a two part valve controlling the movement of the said valve comprising a cylinder and cut-off cylinder therein, and a pilot valve operating within the said cut-off, the pilot and cut-off being arranged to have sliding movements in relation to each other, the cut-off being operatively connected with the main valve, a valve connected with the main valve and automatically operated by means of springs, substantially as described.

3. In a hydraulic elevator the combination of a main valve and a pilot and cut-off valve for controlling the main valve, a cylinder having integrally formed therewith and partly contained therein an extension cylinder of a smaller diameter, an inlet, an elevator cylinder port and an exhaust port therein, a piston valve therein controlling the said ports, a safety valve connected to the said piston valve, whereby communication may be established between the said inlet and elevator cylinder ports, a piston on either side of the piston valve and connected thereto and operating respectively in the said cylinder and extension cylinder, ports also in the said cylinder and pipes connected therewith leading to the said pilot and cut-off valve and establishing communication therethrough between the inlet and that portion of the said cylinder behind the said piston, a cylinder connected to the said main cylinder, ports therein leading to the said pipes and an exhaust port, a cut-off cylinder therein and extending therethrough and connected with the main valve and automatically operated thereby, ports in the said cut-off cylinder communicating respectively with the said ports, a pilot valve in the said cut-off cylinder controlling the said ports in the said cut-off cylinder and having means for external and independent control, all substantially as described.

In testimony whereof we have signed our names to this specification in the presence of two subscribing witnesses.

IVAR CARLSON.
CARL BERGSTROM.

Witnesses:
JAMES H. HOWLAND,
JOHN WARDEN.